Figure 1:
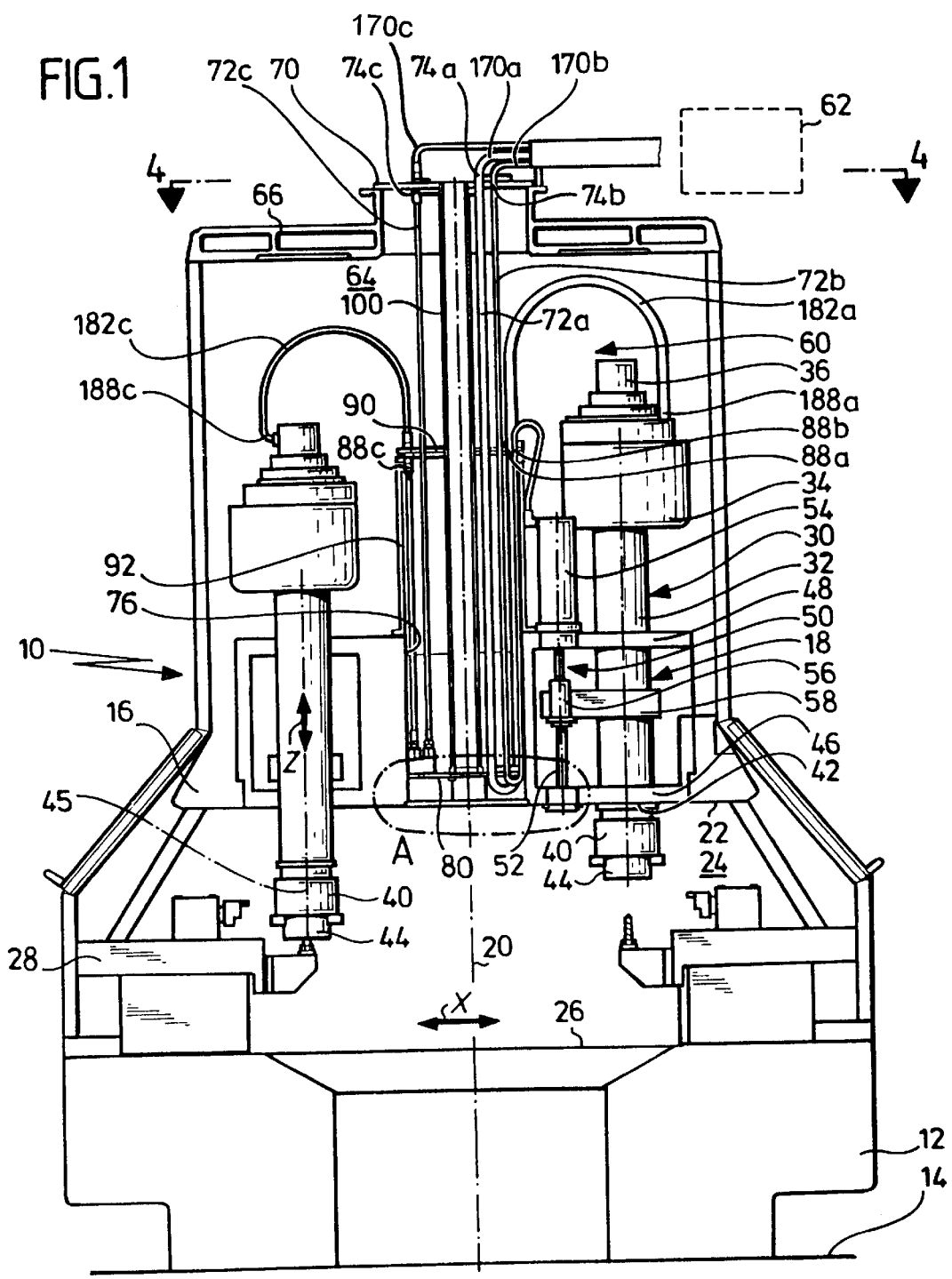

United States Patent
Link et al.

[11] Patent Number: 6,158,312
[45] Date of Patent: Dec. 12, 2000

[54] MACHINE TOOL

[75] Inventors: Helmut Friedrich Link, Aichwald; Guenther Heinrich Trautmann, Kirchheim-Nabern, both of Germany

[73] Assignee: Index-Werke GmbH & Co. KG Hahn & Tessky, Esslingen, Germany

[21] Appl. No.: 09/369,967

[22] Filed: Aug. 6, 1999

[30] Foreign Application Priority Data

Aug. 8, 1998 [DE] Germany .......................... 198 35 954

[51] Int. Cl.[7] .................................................. B23B 3/20
[52] U.S. Cl. .................................. 82/122; 82/129; 82/126
[58] Field of Search .............................. 82/129, 122, 126, 82/127

[56] References Cited

U.S. PATENT DOCUMENTS

| | | | |
|---|---|---|---|
| 1,804,971 | 5/1931 | Bullard, Jr. ........................ | 82/129 |
| 2,568,667 | 9/1951 | Staples ............................. | 29/42 |
| 2,635,325 | 4/1953 | Wader .............................. | 409/15 |
| 2,668,557 | 2/1954 | Hoelscher ......................... | 409/202 |
| 2,892,388 | 6/1959 | Daugherty ........................ | 285/114 |
| 3,260,140 | 7/1966 | Burge .............................. | 82/122 |
| 4,011,777 | 3/1977 | McConnell ....................... | 82/3 |
| 4,100,825 | 7/1978 | McConnell et al. ............... | 82/3 |
| 4,158,319 | 6/1979 | Blockley et al. .................. | 82/3 |
| 4,185,366 | 1/1980 | Gilbert ............................. | 82/3 |
| 4,520,595 | 6/1985 | Diener . | |
| 4,523,359 | 6/1985 | Gippa .............................. | 29/38 A |
| 4,640,158 | 2/1987 | Link et al. ........................ | 82/3 |
| 4,996,897 | 3/1991 | Cucchi ............................. | 82/129 |
| 5,062,330 | 11/1991 | Trautmann et al. ................ | 82/129 |
| 5,697,270 | 12/1997 | Link ................................ | 82/129 |
| 5,699,598 | 12/1997 | Hessbruggen et al. ............. | 82/129 |
| 5,878,633 | 3/1999 | Grund et al. . | |
| 5,896,794 | 4/1999 | Trautmann . | |

FOREIGN PATENT DOCUMENTS

| | | |
|---|---|---|
| 30 25 638 | 1/1982 | Germany . |
| 196 15 425 | 10/1997 | Germany . |
| 196 22 475 | 12/1997 | Germany . |

*Primary Examiner*—A. L. Wellington
*Assistant Examiner*—Erica Ergenbright
*Attorney, Agent, or Firm*—Barry R. Lipsitz; Douglas M. McAllister

[57] ABSTRACT

In order to improve a machine tool comprising a machine frame, a drum arranged for rotation about a drum axis within a maximum angular range in relation to the machine frame and having a plurality of machining devices held on it and drives rotatable with the drum and associated with the machining devices, a stationary control and supply device for the drives and a rotary supply unit which has line systems connected, on the one hand, to the rotatable drum as well as, on the other hand, held so as to be stationary in relation to the machine frame, these line systems being free from interruptions, deformable as a result of rotation of the drum and extending in the direction of the drum axis, in such a manner that the spatial requirements for the twistable line systems in the direction of the drum axis are as small as possible it is suggested that the line systems extend into a passage in the drum close to the drum axis.

20 Claims, 3 Drawing Sheets

MACHINE TOOL

The invention relates to a machine tool comprising a machine frame, a drum arranged for rotation about a drum axis within a maximum angular range in relation to the machine frame and having a plurality of machining devices held thereon and drives associated with the machining devices and rotatable with the drum, a stationary control and supply device for the drives and a rotary supply unit which has line systems which are, on the one hand, connected to the rotatable drum as well as, on the other hand, held so as to be stationary in relation to the machine frame, are free of interruptions and deformable as a result of rotation of the drum and extend in the direction of the drum axis.

A machine tool of this type is known, for example, from DE 196 22 475, wherein in this case the drum is rotatable about a horizontal drum axis and thus an arrangement of the line systems extending on one side of the drum is possible in a horizontal direction.

Machine tools constructed in this way do, however, have the disadvantage that the line systems provided in addition to the constructional length of the drum in the direction of the drum axis require considerable space.

The object underlying the invention is therefore to improve a machine tool of the generic type in such a manner that the spatial requirements for the twistable line systems in the direction of the drum axis are as small as possible.

This object is accomplished in accordance with the invention, in a machine tool of the type described at the outset, in that the line systems extend into a passage of the drum close to the drum axis.

The advantage of this solution is to be seen in the fact that, with it, the constructional length of the drum in the direction of the drum axis can also be utilized to accommodate the line systems. It is thus also possible to design the machine tool with a substantially vertical drum axis and thereby still remain within customary height measurements.

Alternatively and supplementary to this inventive solution it is, however, advantageous, in addition, when each line system has a first line system section extending in a first direction from a stationary holder to an intermediate deflection arranged so as to be freely rotatable about the drum axis and a second line system section extending in a second direction opposite to the first direction from the intermediate deflection to a holder rotating with the drum.

The advantage of this solution is to be seen in the fact that as a result of the provision of a first line system section and a second line system section extending in opposite direction to the first line system section the possibility has been created of, on the one hand, providing as great a length of the twistable line system as possible, namely the sum of the lengths of the first and second line system sections, and, on the other hand, of still achieving as compact a construction of the machine tool as possible. The first and second line system sections may be arranged particularly favorably when the first line system sections and the second line system sections extend at different radial distances from the drum axis since each of the line system sections then has sufficient space for twisting or torsion.

Particularly when the line system sections dip into a central recess of the drum close to the drum axis it has proven to be particularly favorable for the construction when the second line system sections extend at a greater radial distance from the drum axis than the first line system sections since the second line system sections then end at the holder which rotates with the drum and which can then be arranged such that as short a connection as possible to the respective drives for the machining devices can be realized.

The line system sections may be arranged particularly favorably in a basic position of the drum when the first and the second line system sections of a line system are essentially located in a plane extending through the drum axis so that, as a result, a plurality of line systems with respective first and second line system sections can be arranged around the drum axis.

In the embodiments described above, one of the line system sections could extend at an insignificant distance from the drum axis.

With a plurality of line systems and, in particular, with thick line systems it is, however, advantageous when both line system sections extend at a distance from the drum axis which corresponds at least to a thickness of the respective line system.

In this case, during the rotation of the drum each line system is not only twisted or torsioned about its longitudinal direction but also brought into a spiral or helical-like shape with a varying pitch in relation to the drum axis.

In particular for the favorable arrangement of a plurality of line systems in as small a space as possible around the drum axis it is favorable when a number of first line system sections of the line systems extend in a first surface extending around the drum axis and the corresponding number of second line system sections extend in a second surface extending around the drum axis.

These surfaces may, for example, be surface areas of an elliptical prism. It has, however, proven to be particularly favorable when these surfaces are casing surfaces of a circular cylinder.

The intermediate deflections between the first line system sections and the second line system sections can, in principle, be of any optional design and arranged to be freely movable.

However, in order to bring about guidance of the line systems in the area of the intermediate deflections it is preferably provided for the intermediate deflections of the line systems to be guided on an intermediate holder rotatable about the drum axis.

It is thus ensured that during the rotation of the drum relative to the machine frame the line systems do not become entwined in one another in the area of their intermediate deflections.

With respect to the twisting of the first and second line system sections, no further details have been given in conjunction with the preceding description of the inventive solution except for the fact that not only the first but also the second line system sections are intended to twist.

It is particularly favorable when the first line system section and the second line system section twist in such a manner that the angles of rotation per unit of length of the first and the second line system sections are approximately equal, i.e. that the strain on the line system due to twisting in the first and in the second line sections is approximately equal.

This preferably leads to the fact that the ratio of the pitch angle, through which the first line system section twists, to the pitch angle, through which the second line system section twists, corresponds approximately to the ratio of a length of the first line system section to a length of the second line system section.

Such a twisting could, for example, be enforced by a rotary drive for the intermediate holder which is coupled to the rotation of the drum. Such a drive is, however, complicated.

For this reason, a particularly simple solution provides for the intermediate holder to be freely rotatable about the drum axis and for the turning thereof to occur automatically during the rotation of the drum.

In order to ensure the desired ratios of the twisting of the first line system section and of the second line system section at least during maximum turning of the drum relative to the machine frame, it is provided for the intermediate holder to turn relative to the machine frame, during maximum turning of the drum relative to the machine frame, at the most through an angle which corresponds to the maximum pitch angle associated with the first line system section and, moreover, to turn, in particular, relative to the drum at the most through an angle which corresponds to the maximum pitch angle associated with the second line system section.

In order, in addition, to give the intermediate holder the possibility of compensating for any shortening of the first and second line system sections, it is preferably provided for the intermediate holder to be arranged so as to be movable in the direction of the drum axis so that it is possible to fix the line systems in position on the intermediate holder with their intermediate deflections.

In conjunction with the preceding explanations concerning the inventive machine tool it has always been assumed that the drum axis can be aligned not only horizontally but also vertically since the advantageous shortening of the constructional length of the rotary supply unit occurring in an inventive manner is effective irrespective of the alignment of the drum axis.

The inventive solution may, however, be used particularly favorably when the drum axis of the machine tool extends approximately in a vertical direction since, in this case, the inventive shortening of the constructional length is essential in order to keep the height of the machine as small as possible.

In this respect, the alignment of the machining devices is, first of all, optional. For example, it would be conceivable to arrange the axes of the machining devices, as before, in a horizontal direction or in optional intermediate alignments between the horizontal and the vertical directions.

A solution which is particularly favorable, however, for the handling of the workpieces provides for the machining devices to be arranged so as to be suspended in the machine tool. This solution has the advantage that in the case, in particular, of workpieces arranged so as to be suspended on the machining devices an advantageous fall of chippings results and, in addition, it is possible to integrate a particularly favorable handling of the workpieces in that the machining devices are movable in a vertical direction, preferably in the direction of a Z axis, so that workpieces can be taken up and laid down with the machining devices. The fact that the drum axis of the machine tool extends in an approximately vertical direction may be utilized advantageously and consistently, in addition, in that the first line system sections are arranged so as to be suspended on the stationary holder so that the force of gravity can be used to specify a preferred direction for an alignment of the first line system sections.

Furthermore, it is, in addition or alternatively, advantageous when the second line system sections are likewise arranged so as to be suspended on the holder rotating with the drum so that in this case, as well, the force of gravity can be utilized for specifying a preferred direction for the line system sections.

In both cases, the force of gravity acts on the line system sections to the effect that it attempts to align them in their longitudinal direction in a defined manner.

It is particularly favorable with inventive solutions of this type when the intermediate holder is held so as to be suspended from at least one of the line system sections so that an alignment of the intermediate holder is also possible as a result and, on the other hand, the intermediate holder acts at the same time on the line system sections in the sense of a straightening alignment of them.

A solution of the inventive machine tool with a drum axis aligned approximately vertically, which is particularly favorable with respect to the construction, provides for a space close to the drum axis, in which the line systems can advantageously be arranged, to extend in the machine frame proceeding from the stationary holder in an essentially vertical direction as far as the drum.

The line systems may then, in particular, be introduced advantageously into such a space from above.

Particularly when the drum is provided, in addition, with a passage close to the drum axis it is advantageously provided for the space close to the drum axis to extend into the passage of the drum.

The constructional length or constructional height of the rotary supply unit may be kept small, in particular, when the space close to the drum axis extends as far as close to a lower end face of the drum.

A solution which is particularly expedient with respect to the integration of the inventive rotary supply unit provides for the stationary holder to be held on an upper cover of the machine frame so that the entire rotary supply unit extends essentially beneath the upper cover of the machine frame within the same.

Further features and advantages of the invention are the subject matter of the following description as well as the drawings illustrating one embodiment.

Figure 2:
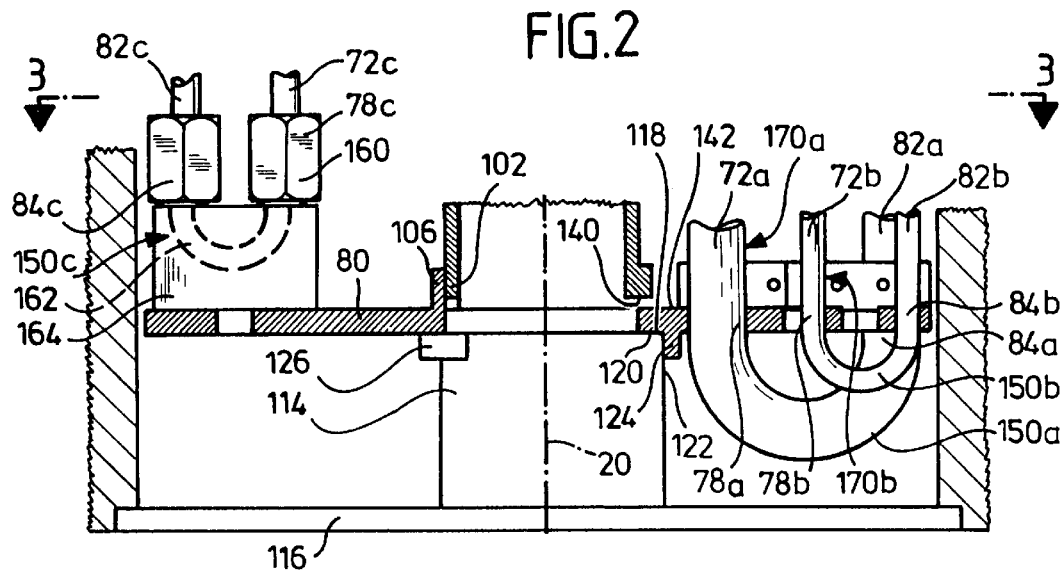
Figure 3:
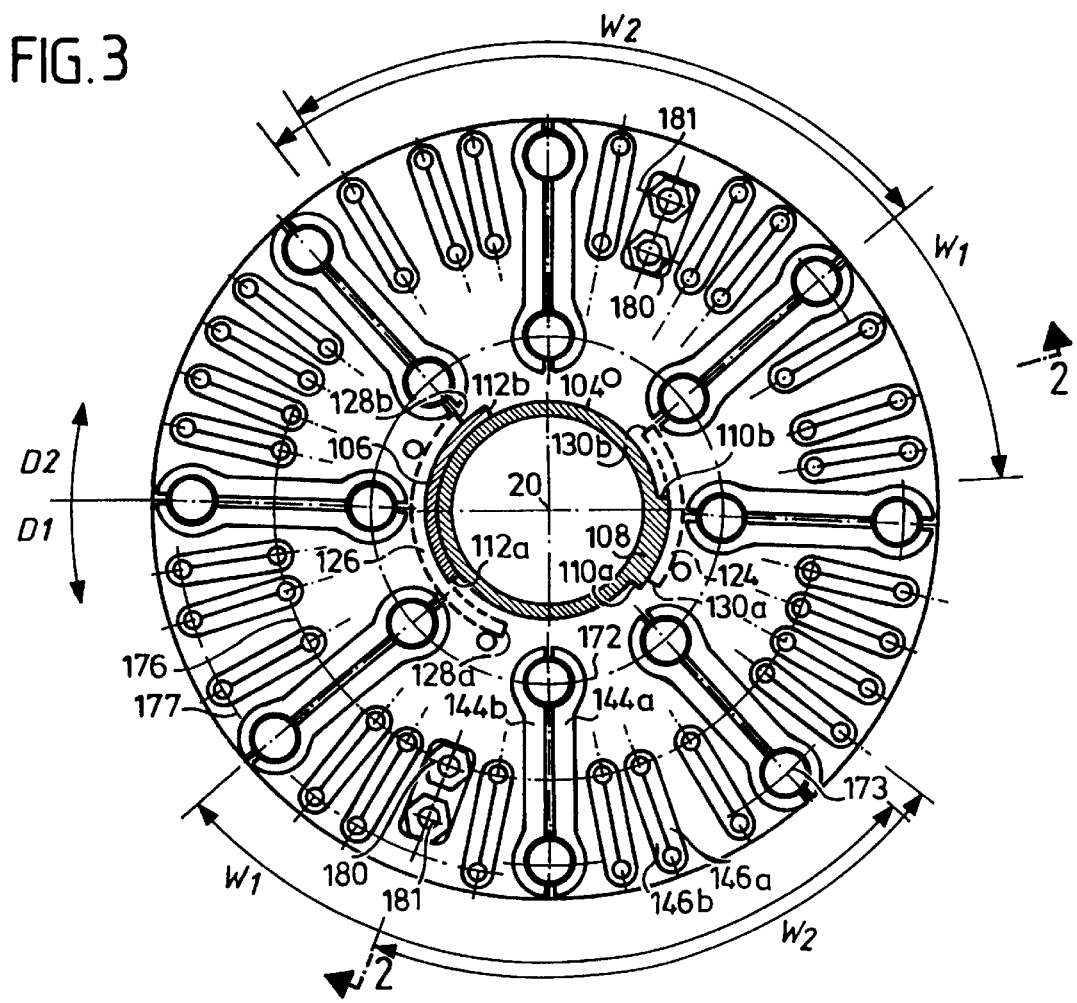
Figure 4:
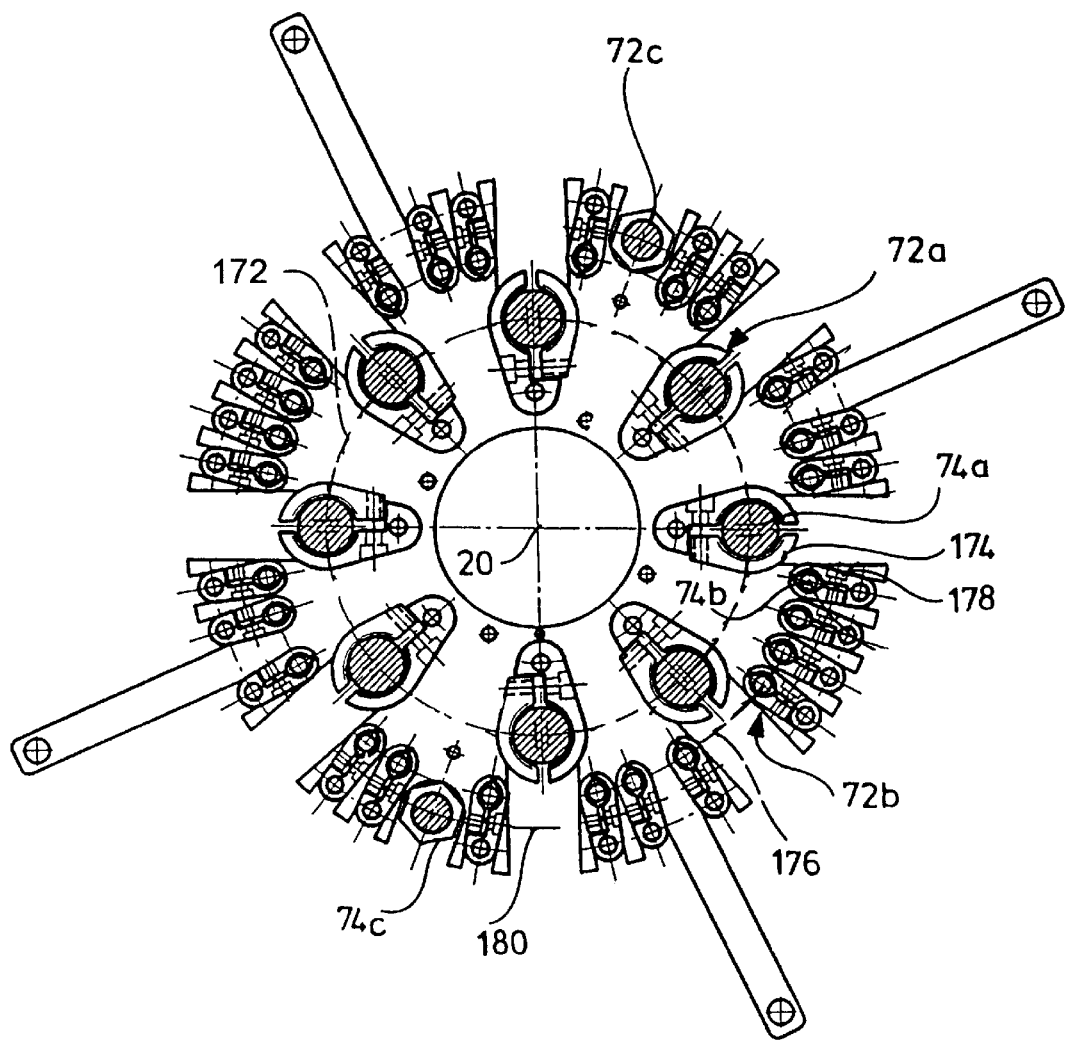

In the drawings:

| | |
|---|---|
| FIG. 1 | shows one embodiment of an inventive machine tool in longitudinal section; |
| FIG. 2 | shows an enlarged partial detail from the area A in FIG. 1 with a section extending along line 2-2 in FIG. 3; |
| FIG. 3 | shows a plan view along line 3-3 in FIG. 2 and |
| FIG. 4 | shows an enlarged plan view along line 4-4 in FIG. 1. |

One embodiment of an inventive machine tool, illustrated in FIG. 1, comprises a machine frame which is designated as a whole as 10 and stands with a lower frame 12 on a base surface 14. A machine column designated as a whole as 16 rests on the lower frame 12 and a spindle drum designated as a whole as 18 is mounted on this column for rotation about a drum axis 20, wherein the drum axis 20 preferably extends approximately at right angles to the base surface 14.

With an end face 22 the spindle drum 18 faces an operating area 24 which is located between the end face 22 and an upper side 26 of the lower frame 12. Tool slides 28 arranged stationarily on the lower frame 12 are provided, on the one hand, in the operating area 24 and these tool slides are preferably movable in an X axis extending radially to the drum axis 20 and define several spindle stations which are arranged so as to be stationary relative to the lower frame 12, preferably at equal angular distances, and of which two spindle stations located opposite one another are illustrated in FIG. 1.

Machining devices 30 designed as workpiece spindles are provided in the spindle drum 18 and are preferably mounted with their sleeves 32 so as to be displaceable in the direction of a Z axis extending parallel to the drum axis 20.

In this respect, each of the working spindles 30 bears a spindle drive 34 movable together with it and an actuating device 36 for a workpiece chuck 40 which is arranged on one end 42 of the working spindle 30 facing the operating area and into which a workpiece 44 is insertable which is thus rotatable about an approximately vertical spindle axis 45 for the machining in the spindle stations.

In order to displace the working spindles 30 in the direction of the Z axis, the sleeves 32 are guided in two bearing brackets 46 and 48 of the spindle drum 18, which are arranged in spaced relationship to one another, for displacement in the direction of the Z axis and are movable in this direction via a linear drive designated as a whole as 50. The linear drive 50 comprises, on the one hand, a threaded spindle 52 which is mounted for rotation in the spindle drum 18 and extends approximately parallel to the drum axis 20 and which can be driven via a Z-axis drive 54 arranged on the spindle drum 18. The threaded spindle 52 thereby passes through a spindle nut 56 which is securely connected to the respective sleeve 32 of the respective working spindle 30 via a holder 58 so that as a result of turning of the threaded spindle 52 the spindle nut 56, and with it the sleeve 32, is movable in the direction of the Z axis and thus parallel to the drum axis 20.

The spindle drives 34 and actuating devices 36 of the working spindles 30 rotating with the spindle drum 18 and the Z-axis drives 54 are supplied via a rotary supply unit 60 which provides a connection between a control and supply device 62, which is indicated merely schematically by broken lines and is arranged so as to be stationary either on the machine frame 10 or next to it, and the rotatable spindle drum 18.

The rotary supply unit 60 is arranged in a space 64 close to the drum axis and extending around the drum axis 20 and comprises a stationary holder 70, which is arranged on a cover 66 of the machine column 16 provided on a side of the spindle drum 18 located opposite the operating area 24 and which is designed, for example, in the shape of a plate extending at right angles to the drum axis 20.

As illustrated in FIG. 1, first line system sections 72*a*, 72*b* and 72*c*, which are fixed with their ends 74*a*, 74*b* and 74*c* on the stationary holder 70 so as to be non-displaceable at least in the direction of the drum axis 20, extend from this holder 70. The first line system sections 72*a*, 72*b* and 72*c* thereby extend, in a basic position of the drum 18 in relation to the machine frame 10, parallel to the drum axis 20 in the direction of the end face 22 of the spindle drum 18 into a central shaft 76 of the spindle drum 18 as far as an intermediate holder 80 which is illustrated in FIGS. 1, 2 and 3 and on which the first line system sections 72*a*, 72*b* and 72*c* are fixed with their ends 78*a*, 78*b* and 78*c* on the side of the intermediate holder.

In the region of the intermediate holder 80, the ends 78*a*, 78*b* and 78*c* of the first line system sections 72*a*, 72*b* and 72*c* on the side of the intermediate holder are then connected to ends 84*a*, 84*b* and 84*c* of second line system sections 82*a*, 82*b* and 82*c* on the side of the intermediate holder, wherein the second line system sections 82*a*, 82*b* and 82*c* are arranged at a greater radial distance from the drum axis 20 than the first line system sections 72*a*, 72*b* and 72*c*.

These second line system sections 82*a*, 82*b* and 82*c* likewise extend, in the basic position of the spindle drum 18 and again proceeding from the intermediate holder 80, approximately parallel to the drum axis 20 in the direction of the cover 66 as far as a holder 90, which is non-rotatably connected to the spindle drum 18 and thus rotates with it and which is preferably likewise designed as a plate and, for example, is arranged in a central area between the intermediate holder 80 and the stationary holder 70. The co-rotating holder 90 is thereby preferably seated on a sleeve 92 extending away from a side of the spindle drum 18 located opposite the operating area 24 and the second line system sections 82*a*, 82*b* and 82*c* are held on the co-rotating holder 90 with their co-rotating ends 88*a*, 88*b* and 88*c*.

In order to guide the intermediate holder 80 in an area close to the end face 22 within the central shaft 76 of the spindle drum 18, a guide tube 100 is provided which extends, proceeding from the stationary holder 70, in the direction of the end face 22 of the spindle drum 18 and which forms in the area of a lower end 102 an outer guide surface 104 which is cylindrical in relation to the drum axis 20 and on which the intermediate holder 80 abuts with a flange segment 106 designed as an arc segment. At the same time, the guide tube has in the area of the lower end 102 a stop segment 108 which projects radially outwards and forms at its arc ends stop surfaces 110*a* and 110*b* which extend in a radial direction in relation to the drum axis 20 and, in order to limit the rotation of the intermediate holder 80, interact with end stop surfaces 112*a* and 112*b* of the flange segment 106 extending in a radial direction in relation to the drum axis 20. The respectively facing end surfaces 110*a* and 112*a* as well as 110*b* and 112*b* are arranged at equal angular distances W1 from one another in the basic position of the spindle drum 18 illustrated in FIG. 3 and thus of the intermediate holder 80, as well.

The guide tube 100 is, furthermore, guided with the lower end 102 so as to be centered in relation to the drum axis 20 by a centering member 114 engaging in the guide tube 100, wherein the centering member 114 is held so as to be centered in relation to the spindle drum 18 via an end plate 116 closing the central shaft 76 of the spindle drum in the area of the end face 22 thereof and is connected thereto so as to be non-rotatable.

The centering member 114 has, in addition, a supporting flange 118 which extends annularly in relation to the drum axis 20 and on which the intermediate holder 80 can be placed with an annular flange surface 120 in the basic position. Moreover, the centering member 114 is provided with a guide surface 122, which is cylindrical in relation to the drum axis 20 and on which the intermediate holder 80 is guided in an abutting manner with a flange segment 124, wherein the flange segment 124 is preferably arranged so as to be opposite the flange segment 106 with respect to the drum axis 20.

Furthermore, the centering member 114 has a cam arc 126 which projects radially outwards beyond the cylinder surface 122 and is provided with end surfaces 128*a* and 128*b* which extend in a radial direction in relation to the drum axis 20 and are arranged so as to face end surfaces 130*a* and 130*b*, respectively, of the flange segment 124 likewise extending in radial direction in relation to the drum axis 20, wherein in the basic position of the intermediate holder 80 relative to the spindle drum 18 and the end surfaces 128*a* and 130*a* as well as 128*b* and 130*b* are spaced at equal angular distances W2 from one another.

The intermediate holder 80 is, in the case of the inventive solution, freely rotatable not only in relation to the machine column 16 but also in relation to the spindle drum 18, wherein a limitation of the maximum turning is, however, specified by the angular distances W1 and W2.

The basic position of the spindle drum 18 in relation to the machine column 16 is selected such that, proceeding from this basic position, the spindle drum can be turned relative to the machine column in a direction of rotation D1 through at the most 180° and in a contrary direction of rotation D2 likewise through at the most 180°, i.e. a rotation of the spindle drum 18 relative to the machine column 16 is possible, altogether, through an angle of smaller than 360°.

The basic position is selected such that in it the line system sections 72a, 72b and 72c as well as 82a, 82b and 82c are not twisted and so in the case of the line system sections 72a and 72b, for example, a twisting thereof can take place through an angle of at the most 180° in direction of rotation D1 and at the most 180° in the opposite direction of rotation D2. Furthermore, the proviso underlying the inventive solution is that a twisting not only of the first line system sections 72a and 72b but also of the second line system sections 82a and 82b is intended to take place in order to keep the twisting of the first line system sections 72a, b as well as of the second line system sections 82a, b altogether as small as possible.

Furthermore, the twisting of the first line system sections 72a, b and of the second line system sections 82a, b per unit of length is intended to be approximately equal so that the ratio of the maximum twisting of the ends 78a, b of the first line system sections 72a, b on the side of the intermediate holder relative to the stationary ends 74a, b in relation to the relative twisting of the co-rotating ends 88a, b of the second line system sections 82a, b relative to the ends 84a, b on the side of the intermediate holder is equal to the ratio of the length of the first line system sections 72a, b between the ends 74a, b and 78a, b in relation to the length of the second line system sections 82a, b between their ends 84a, b and 88a, b.

The angular distances W1 and W2 are also dimensioned in accordance with the maximum twisting provided for the first line system sections 72a, b and the second line system sections 82a, b, namely such that these correspond to the maximum twistings provided so that during maximum turning of the spindle drum 18 proceeding from the basic position in direction of rotation D1 the first line system sections 72a, b are twisted through the angle W1 and the second line system sections 82a, b through the angle W2. The rotation of the intermediate holder 80 relative to the guide tube 100 and thus to the stationary holder 70 or relative to the centering member 114 and thus to the spindle drum 18 is limited by exactly these angles W1 and W2 on account of the end surfaces 110a and 112a as well as 128a and 130a so that during maximum turning of the spindle drum 18 in the direction D1 the end surfaces 110a and 112a, on the one hand, and the end surfaces 128b and 130b, on the other hand, abut on one another and thus the intermediate holder 80 is held, in relation to the basic position, in a rotary position which is turned through the angle W1 in relation to the stationary holder 80 and through the angle W2 in relation to the spindle drum 18.

A rotation in the direction of rotation D2 is possible in the same way, wherein the intermediate holder 80 is, when the spindle drum 18 is rotated to a maximum, turned through the angle W1 in relation to the stationary holder 70 and the angle W2 in relation to the spindle dr um 18.

The uniform twisting of the first line system sections 72a, b and the second line system sections 82a, b per unit of length also results in the fact that the first line system sections 72a, b and the second line system sections 82a, b are shortened by essentially the same amount so that, altogether, a displacement of the intermediate holder 80 in the direction of the drum axis 20, namely towards the stationary holder 70, also takes place in addition to the turning thereof. For this reason, the guide tube 100 is designed such that its end surface 140 is at a distance from a surface 142 of the intermediate holder 80 in its basic position so that the intermediate holder 80 can move in the direction of the stationary holder 70 but is still guided on the centering member 114 and on the guide tube 100.

As illustrated in FIG. 3, a fixing of the ends 78a, b of the first line system sections 72a, b and the ends 84a, b of the second line system sections 82a, b on the intermediate holder 80 is preferably realized by means of clips 144a, b and 146a, b, respectively, which are held on the intermediate holders 80 and respectively clamp the two ends 78a, b and 84a, b at the same time and thus fix them in position in a force-locking manner. The ends 78a, b are connected to the ends 84a, b via a bend 150a or 150b of the respective line system representing an intermediate deflection so that, altogether, the line system sections 72a, b and 82a, b are connected to one another via the bends 150a, b and can be realized by means of a continuous line system 170a, b (FIG. 2).

The line systems 170a, b are preferably electrical line systems, with which individual leads thereof are preferably arranged freely next to one another without any casing in order to facilitate an easier twisting of the line systems.

Alternatively, it is, however, also conceivable to design the individual line system sections 72a, b and 82a, b in a helical shape so that it is even easier to twist them.

The line systems 72c and 82c are, for example, hose lines for the supply of fluid energy to the actuating devices 36, wherein a supplying line system is provided, to which all the actuating devices 36 are connected, wherein the actuating devices have, in addition, valves for switching the fluid energy which are sensitive to torsion.

For this reason, it is provided in torsion-sensitive hose lines of this type for rotary connections 160, which allow a torsion of the line system sections 72c and 82c to be avoided, to be provided in the region of the respective ends 74c and 78c as well as 84c and 88c. These rotary connections 160 are, for example, connected in the region of the ends 78c and 84c to a deflecting member 164 which has a deflecting channel 162 as intermediate deflection 150c and is securely mounted on the intermediate holder 80 and on which the rotary connections 160 are arranged.

One line system 170a is preferably provided for each working spindle 30 for supplying its spindle drive 34 and the actuating device 36 and so, as illustrated in FIGS. 3 and 4, eight line systems 170a of the rotary connection unit 60 are, for example, required in the case of eight spindles and their first line system sections 72a are arranged on a cylinder casing surface 172 coaxial to the drum axis 20 at equal angular distances and extend essentially in this cylinder casing surface 172 parallel to the drum axis 20 as far as the intermediate holder 80 (FIGS. 3 and 4) and their second line system sections 82a extend in a cylinder casing surface 173 (FIG. 3).

In this respect, clips 174 for the force-locking clamping of the line system sections 72a in the region of their ends 74a are likewise preferably provided for securing the line systems on the stationary holder 70 (FIG. 4).

Furthermore, for supplying the Z-axis drive 54 associated with each working spindle 30 a plurality of line systems 170b with first line system sections 72b are required which are all arranged on an additional cylinder casing surface 176 and are likewise fixed with clips 178 at their ends 74b in the region of the stationary holder 70 (FIG. 4).

All the second line system sections 82a and 82b are likewise located on cylinder surfaces 177 illustrated in FIG. 3, with, respectively, even greater radii than the cylinder casing surfaces 172 and 176.

The first line system sections 72c also extend in a cylinder casing surface 180 provided especially for them and the corresponding second line system sections 82c also extend in a cylinder casing surface 181 which is provided especially for them and has a greater radius than the cylinder casing surface 180.

A favorable guidance of the line systems 170a, particularly for the spindle drives 34 movable in the direction of the Z axis and valves for the actuating device 36, as well, results when these line systems form, proceeding from the ends 88a, a U-shaped bend 182a which is open towards the end face 22 of the spindle drum 18 and, proceeding from the end 88a secured on the co-rotating holder 90, is so variable that an end 188a securely connected to the working spindle 30 is movable in the direction of the Z axis so that a flexible supply of the working spindle 30 compensating for the movements in the direction of the Z axis is created at the same time.

The line system 170c designed as a fluid line forms in the same way a U-shaped bend 182c with and 188c for the supply of a working spindle.

What is claimed is:

1. Machine tool comprising a machine frame, a drum arranged for rotation about a drum axis within a maximum angular range in relation to the machine frame, said drum having a plurality of machining devices held thereon and drives rotatable with the drum and associated with the machining devices and a passage extending within said drum close to the drum axis, a stationary control and supply device for the drives and a rotary supply unit having line systems extending in longitudinal directions and being connected, on the one hand, to the rotatable drum as well as, on the other hand, held so as to be stationary in relation to the machine frame, said line systems being free from interruptions, deformable as a result of rotation of the drum and extending with their longitudinal directions in the direction of the drum axis, and said line systems extending into said passage of the drum close to the drum axis.

2. Machine tool as defined in claim 1, wherein the drum axis extends approximately in a vertical direction approximately perpendicular to a base surface.

3. Machine tool comprising:
   a machine frame,
   a drum arranged for rotation about a drum axis within a maximum angular range in relation to the machine frame, said drum having a plurality of machining devices held thereon and drives rotatable with the drum and associated with the machining devices,
   a stationary control and supply device for the drives, and
   a rotary supply unit having line systems extending in longitudinal directions and being connected, on the one hand, to the rotatable drum as well as, on the other hand, held so as to be stationary in relation to the machine frame,
   said line systems being free from interruptions, deformable as a result of rotation of the drum and extending with their longitudinal directions in the direction of the drum axis,
   each line system having:
      a first line system section extending in a first direction from a stationary holder to an intermediate deflection arranged so as to be freely rotatable about the drum axis, and
      a second line system section extending in a second direction opposite to the first direction from the intermediate deflection to a holder rotating with the drum.

4. Machine tool as defined in claim 3, wherein the first line system sections and the second line system sections extend at different radial distances from the drum axis.

5. Machine tool as defined in claim 4, wherein the second line system sections extend at a greater radial distance from the drum axis than the first line system sections.

6. Machine tool as defined in claim 4, wherein both line system sections extend at a distance from the drum axis corresponding at least to a thickness of the respective line system.

7. Machine tool as defined in claim 3, wherein a plurality of first line system sections of the line systems extend in a first circular plane around the drum axis and the corresponding number of second line system sections extend in a second circular plane around the drum axis.

8. Machine tool as defined in claim 3, wherein the intermediate deflections of the line systems are guided on an intermediate holder rotatable about the drum axis.

9. Machine tool as defined in claim 8, wherein the intermediate holder is freely rotatable about the drum axis.

10. Machine tool as defined in claim 9, wherein during maximum turning of the drum relative to the machine frame the intermediate holder is rotatable relative to the machine frame at the most through an angle corresponding to a maximum pitch angle associated with the first line system section.

11. Machine tool as defined in claim 9, wherein during maximum turning of the drum relative to the machine frame the intermediate holder is rotatable relative to the drum at the most through an angle corresponding to a maximum pitch angle associated with the second line system section.

12. Machine tool as defined in claim 8, wherein the intermediate holder is held so as to be movable in the direction of the drum axis.

13. Machine tool as defined in claim 3, wherein the first line system section and the second line system section twist during rotation of the drum in such a manner that the angles of rotation per unit of length of the first and the second line system section are approximately equal.

14. Machine tool as defined in claim 3, wherein the first line system sections are arranged so as to be suspended on the stationary holder.

15. Machine tool as defined in claim 14, wherein an intermediate holder is held so as to be suspended from at least one of the line system sections.

16. Machine tool as defined in claim 3, wherein the second line system sections are arranged so as to be suspended on the holder rotating with the drum.

17. Machine tool as defined in claim 3, wherein a space close to the drum axis extends in the machine frame proceeding from the stationary holder in an essentially vertical direction approximately perpendicular to a base surface as far as the drum.

18. Machine tool as defined in claim 17, wherein the space close to the drum axis extends into the passage of the drum.

19. Machine tool as defined in claim 18, wherein the space close to the drum axis extends as far as a lower end face of the drum.

20. Machine tool as defined in claim 3, wherein the stationary holder is held on an upper cover of the machine frame.

* * * * *